United States Patent [19]

Harigaya et al.

[11] Patent Number: 4,689,699
[45] Date of Patent: Aug. 25, 1987

[54] INFORMATION SIGNAL RECORDING AND/OR REPRODUCING APPARATUS

[75] Inventors: Isao Harigaya, Kanagawa; Susumu Kozuki, Tokyo, both of Japan

[73] Assignee: Canon Kabushiki Kaisha, Japan

[21] Appl. No.: 727,011

[22] Filed: Apr. 25, 1985

[30] Foreign Application Priority Data

| Apr. 27, 1984 [JP] | Japan | 59-86603 |
| Apr. 27, 1984 [JP] | Japan | 59-86604 |
| Apr. 27, 1984 [JP] | Japan | 59-86605 |
| Apr. 28, 1984 [JP] | Japan | 59-86889 |
| Apr. 28, 1984 [JP] | Japan | 59-86890 |

[51] Int. Cl.$^4$ .................. G11B 15/18; G11B 23/36; G11B 27/32
[52] U.S. Cl. .................. 360/74.4; 360/72.2
[58] Field of Search .................. 360/72.1, 72.2, 74.4

[56] References Cited

U.S. PATENT DOCUMENTS

4,418,367 11/1983 Nagai et al. .................. 360/74.4
4,553,180 11/1985 Hasegawa .................. 360/74.4

Primary Examiner—George G. Stellar
Attorney, Agent, or Firm—Toren, McGeady & Associates

[57] ABSTRACT

An apparatus performs recording and/or reproduction of an information signal on or from a tape-shaped record bearing medium arranged to have a main recording area for recording an information signal and a sub-recording area for recording a control signal in a position which is related to the recorded position of the information signal of the main recording area and is not within a non-recording part of a predetermined length in a specific position on the medium. The main recording area and the sub-recording area extend in the longitudinal direction of the medium. The apparatus includes reproducing apparatus for reproducing the control signal from the sub-recording area; determining apparatus for determining whether a change in the output of the reproducing apparatus is caused by a non-recording area of predetermined length; moving apparatus for moving the tape-shaped record bearing medium in the longitudinal direction thereof; and control apparatus for controlling the moving apparatus on the basis of the output of the reproducing apparatus and that of the determining apparatus.

20 Claims, 11 Drawing Figures

INFORMATION SIGNAL RECORDING AND/OR REPRODUCING APPARATUS

BACKGROUND OF THE INVENTION

1. Field of the Invention

This invention relates to an information signal recording and/or reproducing apparatus and more particularly to an apparatus using a tape-shaped record bearing medium having a main recording area for recording an information signal and a sub-recording area for recording a control signal, which are respectively extending in the longitudinal direction of the record bearing medium.

2. Description of the Prior Art

Conventional video signal or audio signal recording and/or reproducing appatatus called video tape recorders (VTR) or audio tape recorders include apparatus of the kind performing functions of searching for the head part of a recorded signal, and a blank part having no recorded signal which are called "head finding" and "blank search" functions. However, in arranging a VTR of the helical scanning type to have these functions, it is preferable to have a control signal recording track (or a sub-recording area) provided in the longitudinal direction along the edge part thereof in addition to helical recording tracks (or main recording area), because: In carrying out the head finding or blank search function, the tape cannot be moved at a sufficiently high speed by tracing recording tracks to reproduce the recorded signal from each of them. That method takes too much time for the search. Further, the method merely gives information about the presence or absence of a record and thus requires some additional arrangement for head finding or searching. Besides, in the event of a partial drop-out in a video signal, that method would mistake the drop-out for a blank part or a non-recorded part.

To solve these problems, a control signal is recorded in the control track. For performing both the blank search and head search operations, the control signal to be recorded in the control track must include information indicating whether a video signal has been recorded or not and information indicating the head or leading part of a video signal. To meet this requirement, it is conceivable to form the control signal by combining more than two different kinds of signals either in a frequency multiplexing manner or in a time sharing manner. However, this necessitates not only the use of a complex circuit for forming the control signal but also the use of complex circuits for extracting and changing the different kinds of information. In addition to that, the information tends to be mistaken due to the presence of a noise component. Further, in the case where no video signal is recorded, the control signal is also not recorded. Accordingly, the part of the control signal recording track corresponding to the non-recorded part of the helical recording track also becomes a non-recorded part. This non-recorded part of the control recording track then gives information indicative of non-recording of the video signal. Therefore, in the event that the control signal is left out by a drop-out in the video signal or the like, the drop-out might be mistaken for a non-recorded part.

Meanwhile, in performing the head finding or blank search function, the tape must be brought to a stop accurately at a desired position.

However, the conventional VTR is arranged to stop the travel of the tape when the tape comes to a desired stop position after the tape is allowed to travel at a high speed. However, the force of inertia of the tape resulting from the high speed travel causes the tape to actually come to a stop after passing the desired stopping position. Further, when the tape is allowed to travel in the reverse direction in performing a head finding or blank search operation, the actual tape stopping position deviates to a great extent in the reverse direction. The tape stopping position thus becomes quite unstable.

In view of the above-stated problems of the prior art, it is a principal object of the present invention to provide an information signal recording and/or reproducing apparatus which is capable of solving all the problems mentioned above.

It is another object of this invention to provide a recording and/or reproducing apparatus which is capable of detecting a non-recorded part and a joint part of a record by means of a control signal of a single kind.

To attain these objects, an information signal recording apparatus embodying this invention comprises: First recording means for recording an information signal within a main recording area provided on a tape-shaped record bearing medium in the longitudinal direction of the record bearing medium; second recording means for recording a control signal within a sub-recording area provided on the tape-shaped record bearing medium in the longitudinal direction thereof in relation to the information signal recording action of the first recording means; and prohibiting means for prohibiting the control signal from being recorded by the second recording means for a predetermined period of time.

It is a further object of this invention to provide an information signal recording and/or reproducing apparatus which, during reproduction of a control signal, never mistakes a noise or a drop-out for a non-recorded part in the event of such an occurrence.

It is a further object of this invention to provide an information signal recording and/or reproducing apparatus which is capable of accurately distinguishing in a main recording area of a record bearing medium whether it has been recorded or not and whether it is at a joint part of a record or not by reproducing a control signal of a single kind from a sub-recording area of the medium.

To attain these objects, an apparatus arranged according to this invention to perform an information signal recording and/or reproducing operation on a tape-shaped record bearing medium having a main recording area for recording an information signal and a sub-recording area for recording a control signal in a position which is related to the recorded position of the information signal in the main recording area and is not within a non-recording part of a predetermined length arranged in a specific position, both the main recording and sub-recording areas extending in the longitudinal direction of the medium, comprises: Reproducing means for reproducing the control signal from the sub-recording area; determining means for determining whether a change which occurred in the output of the reproducing means is caused by the non-recording part of the predetermined length; moving means for moving the tape-shaped record bearing medium in the longitudinal direction thereof; and control means for controlling the moving means on the basis of the output of the reproducing means and that of the determining means.

It is a further object of this invention to provide a method and an apparatus capable of accurately and stably bringing a tape-shaped record bearing medium to a stop at a desired stopping position.

It is a further object of this invention to provide a method and an apparatus capable of accurately bringing a tape-shaped record bearing medium, to a stop at a desired stopping position regardless of the travelling speed and direction of the medium before the stop.

It is a still further object of this invention to provide a method and an apparatus capable of quickly and stably bringing a tape-shaped record bearing medium to a stop at a desired stopping position even when that medium must be allowed to travel for a predetermined period of time in determining whether the position of the medium is a desired stopping position or not.

To attain these objects, an apparatus arranged according to this invention uses a tape-shaped record bearing medium having a main recording area for recording an information signal and a sub-recording area for recording a control signal in a position which is related to the recorded position of the information signal in the main recording area and is not within a non-recording part of a predetermined length arranged in a specific position, both the main recording and sub-recording areas extending in the longitudinal direction of the medium; comprises: Reproducing means for reproducing the control signal from the sub-recording area; moving means for moving the tape-shaped record bearing medium in the longitudinal direction thereof; determining means for determining, during the travel of the tape-shaped record bearing medium caused by the moving means in the first longitudinal direction thereof at a first speed, whether or not a change occurred in the output of the reproducing means is caused by the non-recording part of a predetermined length; first control means arranged to control the moving means to cause the tape-shaped record bearing medium to travel at a second speed which is lower than the first speed in a second direction which is reversed from the first direction on the basis of the output of the determining means; and second control means arranged to control the moving means to bring the tape-shaped record bearing medium to a stop when the output of detecting means which detects the output of the reproducing means changes while the moving means is under the control of the first control means.

Futhermore, under these objects, a method according to this invention for bringing to a stop a tape-shaped record bearing medium having a main recording area for recording an information signal and a sub-recording area for recording a control signal in a position which is related to the recorded position of the information signal in the main recording area and is not within a non-recording part of a predetermined length arranged in a specific position, with both the main recording and sub-recording areas extending in the longitudinal direction of the medium, comprises: A first step of causing the tape-shaped record bearing medium to travel in a first direction at a first speed and detecting a level drop point of a reproduced control signal obtained from the control signal; a second step of determining whether the level drop point detected by the first step corresponds to a desired stopping position; a third step of causing the tape-shaped record bearing medium to travel in a second direction which is reveresed from the first direction and at a second speed which is lower than the first speed when the level drop point is determined by the second step to correspond to the desired stopping point; and a fourth step of bringing the tape-shaped record bearing medium to a stop by detecting a level rise point of the reproduced control signal while the medium is travelling in the second direction and at the second speed.

The above and further objects and features of this invention will become apparent from the following detailed description of a preferred embodiment thereof taken in conjunction with the accompanying drawings.

BRIEF DESCRIPTION OF THE DRAWINGS

FIGS. 4(a)–4(d) are timing charts showing the output wave forms of various parts of FIG. 3.

DETAILED DESCRIPTION OF THE PREFERRED EMBODIMENTS

Figure 1:
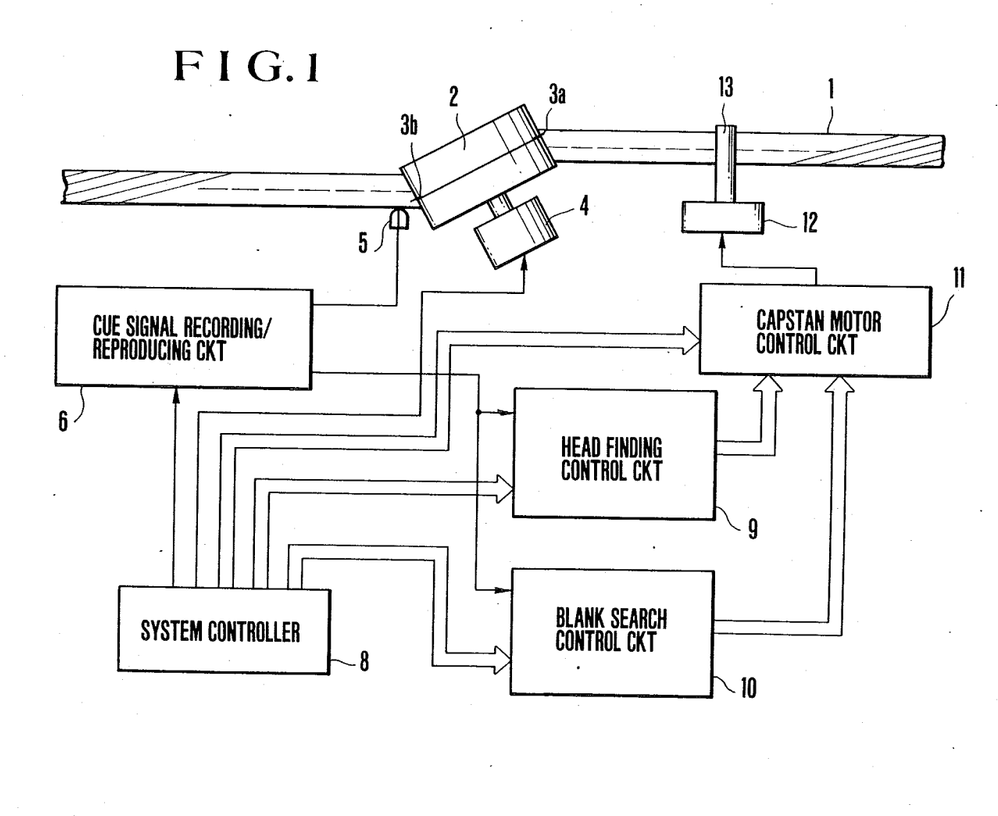
FIG. 1 is a block diagram, showing the essential arrangement of a VTR in an embodiment of this invention.

The following describes in detail an embodiment in whIch this invention is applied to a helical scanning type VTR:

Description of the Whole Arrangement of the Embodiment: FIG. 1 shows the main components of the VTR in an embodiment of this invention. The illustration includes a magnetic tape 1 which is employed as a record bearing medium; a rotary drum 2; and rotating heads 3a and 3b which are secured to the drum 2 and are arranged to record and reproduce a video signal respectively. A drum motor 4 is arranged to rotate the drum 2. A fixed head 5 is arranged to record and reproduce a cue signal (or a continuous wave control signal), which will be described later herein. A cue signal recording-/reproducing circuit 6 is arranged in combination with the fixed head 5. A system controller 8 is arranged to supply information on the varied operation modes of the VTR such as recording, reproduction, quick or fast feeding and quick or fast returning modes to applicable components of the VTR. A head finding control circuit 9 is arranged to find the head of a recorded signal by using a reproduced cue signal. A blank search control circuit 10 is arranged to search for a blank part by using the reproduced cue signal.

Figure 2:
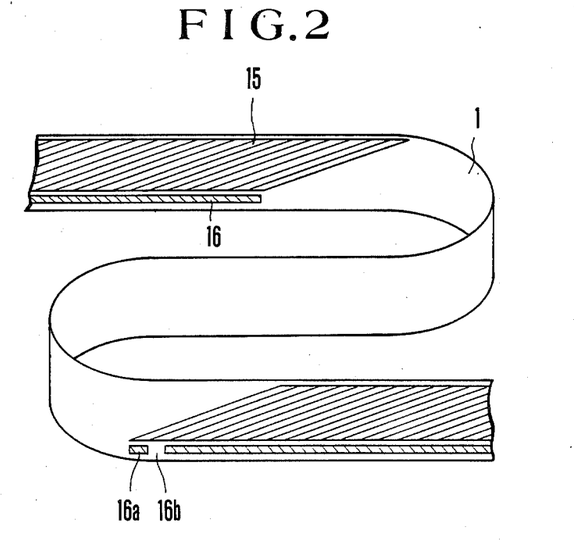
FIG. 2 is an illustration of a cue signal (or control signal) obtained by the VTR shown in FIG. 1.

A capstan motor control circuit 11 is arranged to cause, via a capstan motor 12, a capstan 13 to operate as desired based on information obtained from the system controller 8, the head finding control circuit 9, the blank search control circuit 10, etc. The operation of each of the components of the VTR shown in FIG. 1 is as described below:

The Cue Signal Recording/Reproducing Circuit 6: FIG. 2 shows the cue signal (a control signal) arrangement of the VTR according to this invention. Helical recording tracks (a main recording area) 15 are formed on the magnetic tape 1. A video signal is recorded and reproduced on and from the recording tracks 15. A track 16 is formed in the longitudinal direction of the tape 1 with the cue signal formed therein. In this specific embodiment, the cue signal includes a short continuous wave signal 16a, which is recorded in a position corresponding to the record starting part of the video signal; a no recorded part 16b which follows the short recorded part 16a; and a continuous wave part which is of the same wave as the part 16a and follows the no recorded (or blank) part as shown in FIG. 2.

Figure 3:
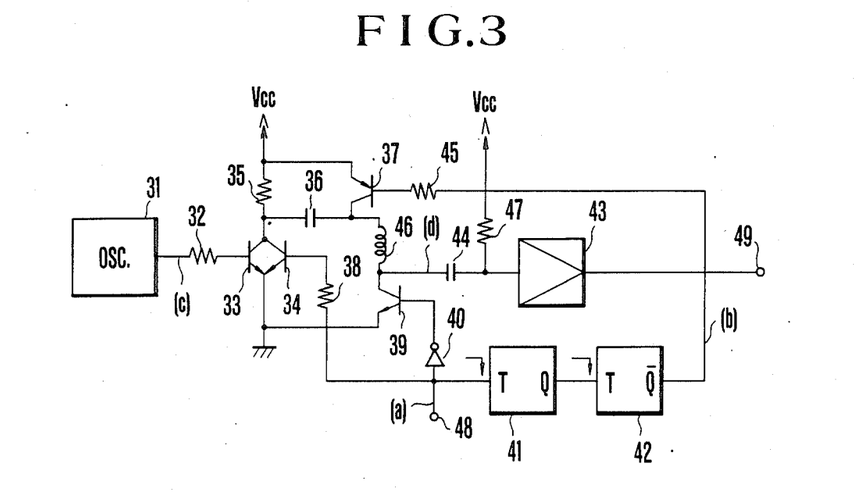
FIG. 3 is a circuit diagram showing, by way of example, a cue signal recording/reproducing circuit arranged to record and reproduce the cue signal shown in FIG. 2.

FIG. 3 shows, by way of example, the details of the cue signal recording/reproducing circuit 6 which is arranged to record and reproduce the cue signal. The circuit arrangement includes a clock pulse generator 31; resistors 32, 35, 38, 45 and 47; transistors 33, 34, 37 and 39; capacitors 36 and 44; an inverter 40; monostable multi-vibrators 41 and 42; an amplifier 43; a winding 46 of the head 5; a terminal 48 which is arranged to receive a head control signal HC from the system controller 8; and a terminal 49 which is arranged to receive a reproduced cue signal.

Figure 4A:
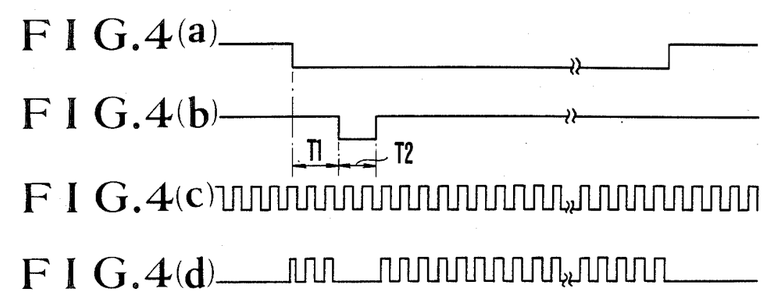

FIGS. 4(a)–4(d) show in a timing chart the wave forms of various parts (a)–(d) shown in FIG. 3. The cue signal recording/reproducing circuit 6 operates as follows: As shown in FIG. 4(a), the signal HC is arranged to be at a low level only when the VTR is in a video signal recording mode and with this exception to be always at a high level. Hereinafter a low level is referred to as L and a high level as H.

The operation at the time of video signal recording is as follows: When the VTR begins to record a video signal, the level of the signal HC changes from H to L. This causes the output level of the inverter 40 to change from L to H. The transistor 39 then turns on to supply power supply to the winding 46.

Meanwhile, a clock signal is produced from the clock pulse generator 31, as shown in FIG. 4(c), to turn the transistor 33 on and off. When the transistor 37 is off, a signal of the same wave form as that of the clock signal is supplied via the capacitor 36 to the winding 46. This signal is recorded by the head 5 as the cue signal on the tape 1 in the recording track 16 which extends in the longitudinal direction of the tape 1. Futhermore, the signal HC is supplied to the monostable multivibrator 41. The monostable multivibrator 41 is triggered by the fall of the signal HC. As a result, the level of the output Q of the multivibrator 41 becomes H for a short period of time T1 as shown in FIG. 4(b). The other monostable multivibrator 42 is triggered by the fall of the output of the multivibrator 41. Then the level of an output $\overline{Q}$ of the monostable multivibrator 42 becomes L just for a predetermined period of time T2, as shown in FIG. 4(b). The transistor 37 turns on when the level of the output $\overline{Q}$ of the multivibrator 42 is L. During this period T2, the cue signal is inhibited from being recorded. The transistor 37 is off when the output $\overline{Q}$ of the monostable multivibrator 42 is at H. Therefore, during the process of video signal recording, the clock signal is recorded as the cue signal in the longitudinal track 16 except during the period T2.

During the process of video signal recording, the tape 1 is caused to travel at a constant speed by the capstan 13, which operates in combination with a pinch roller (not shown). With the tape 1 travelling in that manner, the cue signal is recorded in the track 16 as shown in FIG. 2. In this instance, the length of the cue signal part 16a in the longitudinal direction of the tape 1 and that of the blank part 16b of the cue signal are in the ratio of T1:T2.

The operation during times other than during the video signal recording is as follows: The signal HC is at H in this case. The transistor 34 is on. The clock signal produced from the clock pulse generator 31 is blocked there. The output level of the inverter 40 is L. The transistor 39 is off. Then the circuit arrangement for the head 5 is grounded via the resistor 47, the capacitor 44, the winding 46, the capacitor 36 and the transistor 34.

Therefore, if the head 5 is tracing the clock signal recorded part of the track 16 while the tape 1 is on the move under the above-stated condition, the recorded clock signal is detected by one end of the winding 46 of the head 5. The clock signal thus detected is amplified by the amplifier 43. The output of the amplifier 43 is supplied via the terminal 49 to the head finding control circuit 9 and the blank search control circuit 10, as will be further described later.

The cue signal shown in FIG. 2 is thus recorded and reproduced by the arrangement described above. In the arrangement of the example described, one and the same clock signal is recorded and reproduced for the head finding and blank search operations. However, it is, of course, possible to have some other control signal superimposed on the above-stated cue signal to permit varied kinds of control to be simultaneously performed.

Figure 5:
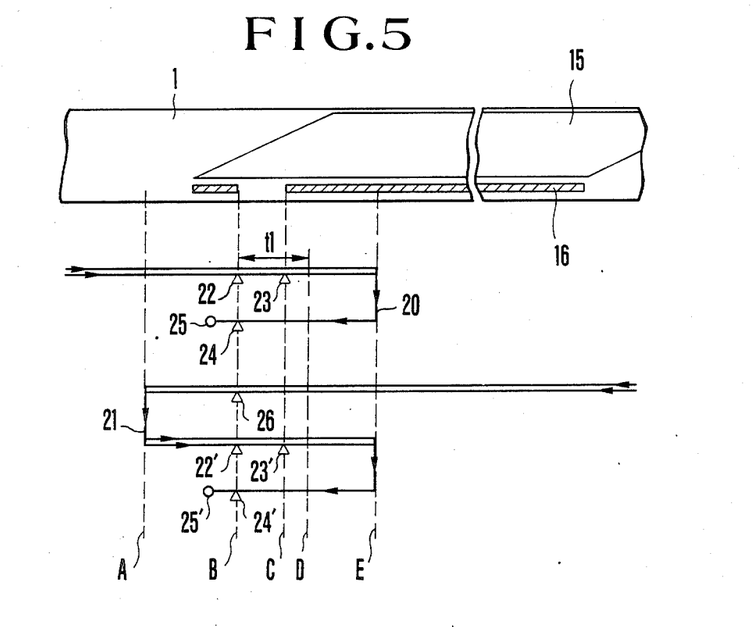
FIG. 5 is an illustration conceptionally showing a head finding control method employed by the VTR of FIG. 1.

Head Finding Control Circuit: The head finding control circuit 9, which is shown in FIG. 1, operates in the following manner: The concept of the method for the head finding operation of the VTR is as shown in FIG. 5. Referring to FIG. 5, in the case where the head finding operation is to be performed by quickly feeding the tape 1 in the same direction as the direction in which recording was performed, a line 20 indicates the position of the head 5 on the track 16. In the event of a head finding operation to be performed by quickly returning the tape 1, a line 21 indicates the position of the head 5 on the track 16. A mark Δ indicates each detected position. A mark o indicates a final stopping position. Each of double lines indicates that the tape 1 is travelling at a high speed.

In the case of a head finding operation to be performed by quickly feeding the tape 1, a drop in the level of the reproduced cue signal is detected at a point B (Δ 22). Then, it is determined whether this is the head part of the recorded video signal or the head part of a non-recorded portion of the tape 1. After this, a point C (Δ 23) at which the level of the reproduced cue signal again rises within a predetermined distance, t1 is detected. Then, whether this part represents the non-recorded part 16b corresponding to the head part of the recorded video signal is determined. The quick or fast feeding operation is then brought to an end at this point of time. In an actual operation, however, the force of inertia of the tape 1 due to the high speed travel thereof brings the head 5 to a point E. Therefore, the tape 1 is rewound at a low speed in the reverse direction to bring it to a stop with the rise of the level of the reproduced cue signal detected at a point B (Δ 24). In this instance, the head 5 is positioned at a point (o 25) close to the point B as since the tape 1 is caused to travel at a low speed.

If the head finding operation is to be performed by quickly returning or rewinding the tape 1, a distance between the fall of the reproduced cue signal and the rise thereof is detected at a point B(Δ 26). The quick tape rewinding operation is brought to an end if the distance is less than a predetermined distance t1. This time, the above-stated force of inertia brings the head 5 to a point A. Then, the tape moving operation is changed to a quick feeding operation. The tape 1 is then brought to a stop at a point o 25' close to a point B (Δ 22', Δ 23' and Δ 24') through the same process as in the case of the head finding operation by quick tape feeding.

With the head finding operation performed on the tape 1 in this manner, it is possible to discriminate between the head or leading part of a recorded video signal 16a and the head part of a non-recorded portion 16b or a blank portion of the tape 1 (hereinafter will be referred to as head-blank discrimination) even with the cue signal which consists of only one and the same kind of clock signal. In both cases of quick tape returning and quick tape feeding operations for head finding, the tape 1 is arranged to be moved at a low speed in a predetermined direction (rewinding direction) immediately before it comes to a stop. This arrangement ensures that the tape 1 stably comes to a stopping position. The head finding operation can be satisfactorily carried out with little affect by the above-stated force of inertia. Futhermore, the length of the non-recorded part 16b of the cue signal is arranged to be always detected by allowing the tape 1 to travel in the same direction. The direction in which the tape 1 is allowed to travel at a low speed is also the same as the direction of the non-recorded part 16b. Therefore, a tape stopping instruction can be received without fail immediately before the non-recorded part 16b. The arrangement thus precludes the possibility of an unstable stopping position resulting from variations in the length of the non-recorded part 16b and the travelling direction of the tape 1. Futhermore, the adverse effect of the force of inertia resulting from low speed travel is reduced by utilizing a portion of tape travel required by the above-stated head-blank discrimination), so that the number of steps required before bringing the tape 1 to a stop can be minimized in obtaining a maximum effect.

Figure 6:
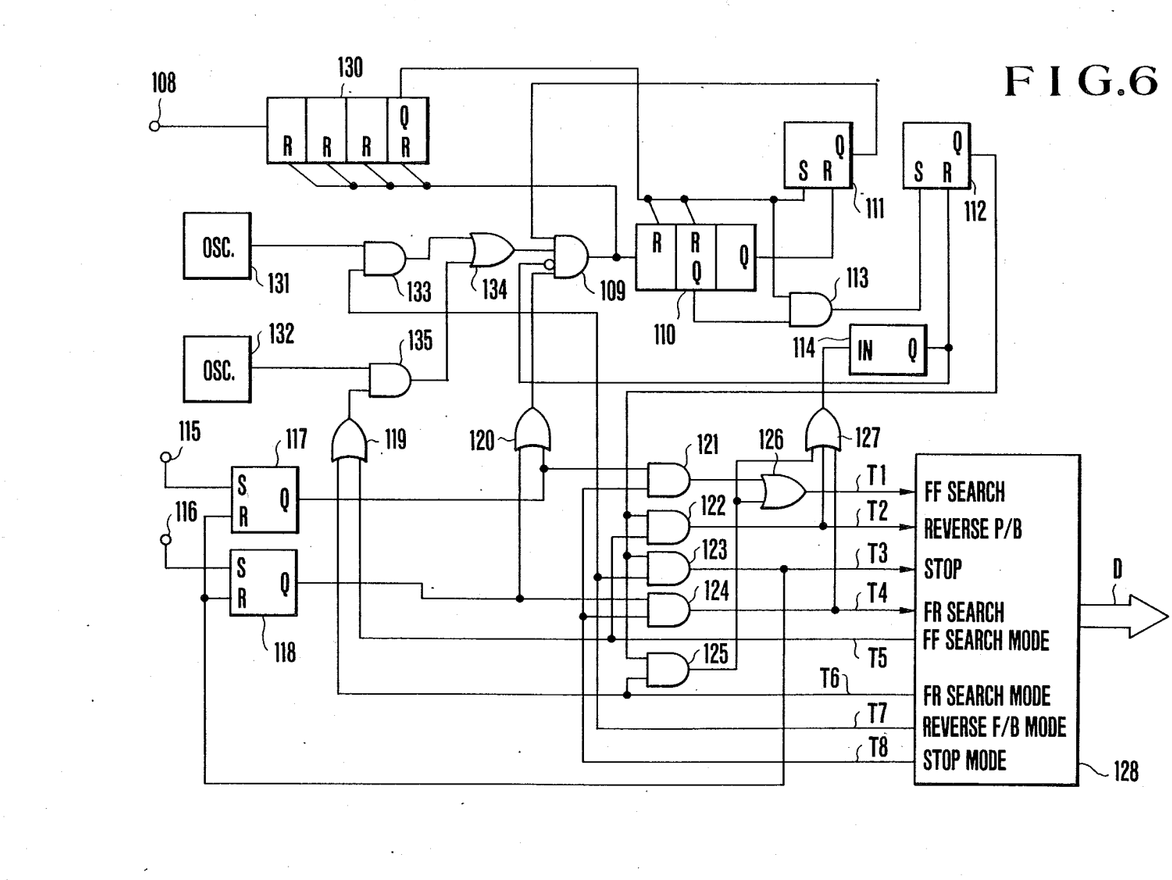
FIG. 6 is a circuit diagram showing, by way of example, the details of a head finding control circuit which is shown in FIG. 1.

FIG. 6 shows, by way of example, a circuit arranged to perform the above-stated head finding operation. The reproduced and amplified cue signal, which is described in the foregoing with reference to FIGS. 1 and 3, is supplied via a terminal 108 to a counter 130. Terminals 115 and 116 are arranged to receive from the system controller 8 an instruction for head finding by quickly or fast feeding the tape 1 (FF) and another instruction for head finding by fast rewinding the tape 1 (FR). These instructions are supplied in the form of pulse signals.

Signals supplied to and produced from a control data generating circuit 128 are as follows: The control data generating circuit 128 is arranged to supply a control data D to the capstan motor control circuit 11, which is shown in FIG. 1. The control data D which is indicated by an arrow in FIG. 6 does not relate directly to this invention and, therefore, is omitted from description here. The signals to be supplied to the control data generating circuit 128 include an FF (fast forward) travel start instruction signal T1; a reverse direction reproduction start instruction signal T2; a stop instruction signal T3; and an FR (fast return) travel start instruction signal T4. The signals to be produced from the circuit 128 include a signal T5 representing an FF mode; a signal T6 representing an FR mode; a signal T7 representing a reverse direction reproduction mode; and a signal T8 representing a stop mode. In other words, the control data generating circuit 128 is arranged to generate data corresponding to these instruction signals T1, T2, T3 and T4 and to indicate the condition of the capstan motor 12 by means of the output signals T5, T6, T7 and T8. The illustration of FIG. 6 includes flip-flops 111, 112, 117 and 118; clock pulse generators 131 and 132; OR gates 119, 120, 126, 127 and 134; AND gates 109, 113, 121, 122, 123, 124, 125, 133, 134 and 135; a monostable multivibrator 114; an amplifier 129; and counters 110 and 130.

The circuit shown in FIG. 6 operates as follows: When an FF head finding instruction is supplied from the terminal 115, the instruction sets the flip-flop 117 and causes the level of one of the input signals of the AND gate 109 to become H. Meanwhile, an H signal is also supplied to one of the input terminals of the AND gate 121. Since the tape 1 is still in repose at that time, the signal T8 is at a high level (H). Furthermore, when one of the output signals T5, T6, T7 and T8 is at H, it indicates that the VTR is in the applicable mode. Therefore, the output level of the AND gate 121 changes to H to cause the level of the signal T1 to become H via the OR gate 126. The instruction signals T1, T2, T3 and T4 are arranged to have their instructions carried out when they are at H. Therefore, with the instruction signal T1 thus becoming H, the capstan motor 12 begins to drive the capstan 13 in the FF mode. The head 5 performs a reproducing operation on the track 16 to produce the reproduced cue signal.

The cue signal thus produced is counted by the four-bit counter 130. The counter 130 produces an H output from the terminal Q thereof when the counted value thereof exceeds 8. Then, the three-bit counter 110 is reset and the flip-flop 111 is set. The flip-flop 111 produces an H output from the terminal Q thereof. The level of one of the inputs of the AND gate 109 thus becomes H. Since the VTR is in the FF mode and the signal T5 is at H, the AND gate 135 has an H input supplied to one of its input terminals via the OR gate 119.

The clock pulse generators 131 and 132 generate clock pulses at frequencies corresponding to recording and reproducing operations and FF and FR operations respectively. For example, if the tape 1 speed for the FF and FR operations is nine times as high as the tape 1 speed for recording and reproducing operations, the clock pulse generator 132 is producing clock pulses at a frequency nine times as high as that of the clock pulses produced from the other generator 131. Therefore, even with the tape 1 speed changed, the extent of the tape 1 travel during one period of the clock pulses generated by the generator 131 or 132 remains unchanged.

Since the apparatus is in the FF mode, the AND gate 135 supplies the output of the clock pulse generator 132 to the AND gate 109 via the OR gate 134. At that time, the output level of the timer 114 which will be described later is at L, that of the flip-flop 111 at H and that of the OR gate 120 at H. Then, the clock pulses produced from the clock pulse generator 132 are counted by the three-bit counter 110. The counter 110 is reset every time 8 clock pulses of the cue signal have been received. The frequency of the clock pulses of the cue signal is arranged to be sufficiently higher than those of the clock pulses generated by the clock pulse generators 131 and 132. Therefore, while the clock pulses of the cue signal are being reproduced, the number of clock pulses counted by the three-bit counter 110 is either 0 or 1. In other words, the three-bit counter 110 is arranged to measure a period of time between a point of time when the clock pulses of the cue signal are no longer reproduced and a point of time when they are reproduced again. The level of the output of the terminal Q produced at the second bit of the three-bit counter 110 becomes H when the count value of the counter 110 is 2 and 3. The level of the output from the terminal Q produced at the third bit becomes H when the counted value is 4 or higher than 4. When the output level of the terminal Q produced at the third bit becomes H, the flip-flop 111 is reset and the gate of the AND gate 109 is closed.

This operation is correlated to the illustration of FIG. 5 is as follows: When the clock pulses of the reproduced cue signal is no longer obtainable at the point B ($\Delta$ 22), the counter 110 is released from a reset state and begins to count the clock pulses generated by the generator 132. Meanwhile, the oscillation frequency of the oscillator 132 is set in relation to the length of the non-recorded part 16b and the tape 1 speed at such a value that the counted number of the counter 110 becomes 2 or 3 before the clock pulses of the cue signal are again counted at the point, C ($\Delta$ 23). Therefore, with the cue signal again being reproduced at the point C ($\Delta$ 23), when the level of the Q output of the counter 130 becomes H, the output level of the AND gate 113 changes to H. The level of the Q output of the flip-flop 112 also changes to H. At this time, since the levels of both the inputs of the AND gate 122 become H, the output (T2) of the AND gate 122 becomes H bringing the apparatus into a reverse direction reproducing (reverse P/B) mode. The counter 110 is then reset. Meanwhile, if the clock pulses of the cue signal are not again reproduced after the tape 1 is allowed to travel for the period of time t1, the level of the Q output produced at the third bit of the counter 110 becomes H. The level of the Q output of the flip-flop 112 becomes L, no longer permitting clock pulses to pass through the AND gate 109.

Meanwhile, in some cases, the discontinuance of reproduction of the clock pulses of the cue signal is caused by a drop-out. Furthermore, in the arrangement of the kind described, the Q output of the counter 130 cannot sometimes be stably obtained due to unstable travel of the tape 1. Then, such an unstable condition also sometimes results in discontinuance in the reproduction of the clock pulses of the cue signal. However, the number of clock pulses to be counted by the counter 110 during the short discontinuance period of reproduction is only 1, at the most in the case of the circuit arrangement of FIG. 6. Therefore, the length of the non-recorded part 16b is not subjected to the determination of whether it is longer or shorter than the predetermined length t1 shown in FIG. 5.

When the reverse P/B mode is designated by the instruction signal T2 at the point C ($\Delta$ 23) shown in FIG. 5, the capstan motor 13 is caused via the capstan motor control circuit 11 to move the tape 1 in a direction reverse to FF, i.e. in the tape 1 rewinding direction, at a low speed. In this instance, however, the tape 1 is actually moved at a low speed (the same speed as the speed employed in recording) in the reverse direction when the head 5 is brought to the point E of FIG. 5 by the force of inertia mentioned in the foregoing.

With the tape 1 beginning to travel at a low speed in the reverse direction, the timer 114 is triggered to operate for a predetermined period of time. During this period, the operating output (Q) of the timer 114 is inverted and supplied to the AND gate 109 in the inverted state to thereby prevent the clock pulses from passing. This arrangement prevents the above-stated length of the non-recorded part 16b from being determined before stabilization of the travel of the tape 1 after the change-over of the mode. After the change-over to the reverse P/B mode, the level of the output T7 of the capstan motor control circuit 128 becomes H. The AND gate 133 then supplies the clock pulses produced from the generator 131 to the AND gate 109 via the OR gate 134. When the output level of the timer 114 changes to L, the clock pulses produced from the generator 131 are supplied to the counter 110.

Then, when the head 5 again comes to the point C, the counter 110 is no longer reset and begins to count the clock pulses produced from the generator 131. As is apparent from the foregoing description, the head 5 again reaches the point B ($\Delta$ 24) when the count advances to 2 or 3. At that point, the clock pulses of the cue signal again begin to be reproduced. Then, the Q output of the counter 130 causes the output level of the AND gate 113 to change to H. The level of the output of the Q terminal of the flip-flop 112 also becomes H. At this time, since the level of the signal T7 is at H, the levels of both inputs of the AND gate 123 become H to bring the apparatus into the stop mode. The tape 1 then stops travelling. Since the influence of the inertia is small this time, the tape 1 comes to a stop when the head 5 comes to the position of o 25.

Referring to a line 21 of FIG. 5, the operation in the event of an instruction for FR head finding is as follows: With the FR head finding instruction supplied from the terminal 116, the flip-flop 118 is set. Then, the level of one of the inputs of the AND gate 109 is caused to become high via the OR gate 120. The signal T4 also becomes a high level (H). Accordingly, the capstan 13 is controlled and driven in the FR mode. Then, when the level of the signal T6 becomes H, the output level of the OR gate 119 becomes H. The output of the generator 132 comes to be supplied to the counter 110 via the AND gate 135, the OR gate 134 and the AND gate 109.

When the head 5 reaches the point C, the clock pulses of the cue signal are not reproduced any longer. The counter 110 is released from a reset state. The counter 110 counts the clock pulses produced from the generator 132. The count is performed two or three times before the head 5 reaches the point B ($\Delta$ 26). Then, when the clock pulses of the cue signal are again reproduced at the point B, the output level of the AND gate 113 changes to H. The Q output level of the flip-flop 112 becomes H. Since the signal T6 is at H at that time, the level of the signal T1 is caused to become H via the AND gate 125 and the OR gate 126. With the level of the signal T1 becoming H, an instruction is issued for the FF mode. The above-stated force of inertia then causes the head 5 to come to the point A and the travelling direction is reversed. Futhermore, at that time, the output of the AND gate 125 is supplied to the above-stated timer 114 to make the output level of the timer 114 H for a short period of time. This prevents the clock pulses from passing through the AND gate 109 immediately after change-over of the mode.

With the FF mode obtained in this manner, the operation there after is similar to the operation performed in the case of the instruction for FF head finding and therefore does not require further description thereof. Futhermore, the operations for positions Δ 22', Δ 23' and Δ 24' shown in FIG. 5 are similar to the operations for the positions Δ 22, Δ 23 and Δ 24. Position o 25' is also the same, as the position o 25.

As is apparent from the foregoing description, the head finding or search operation can be accomplished by the circuit arrangement of FIG. 6. The advantages mentioned in the foregoing are, of course, also attainable by the circuit arrangement. Further, in addition to the advantages mentioned in the foregoing, another advantage of the circuit arrangement of FIG. 6 lies in the following: Even in the event of the occurrence of a level drop for a very short period in the reproduced cue signal, it is never mistaken for the head or leading part of a video signal.

Blank Search Control Circuit

Figure 7:
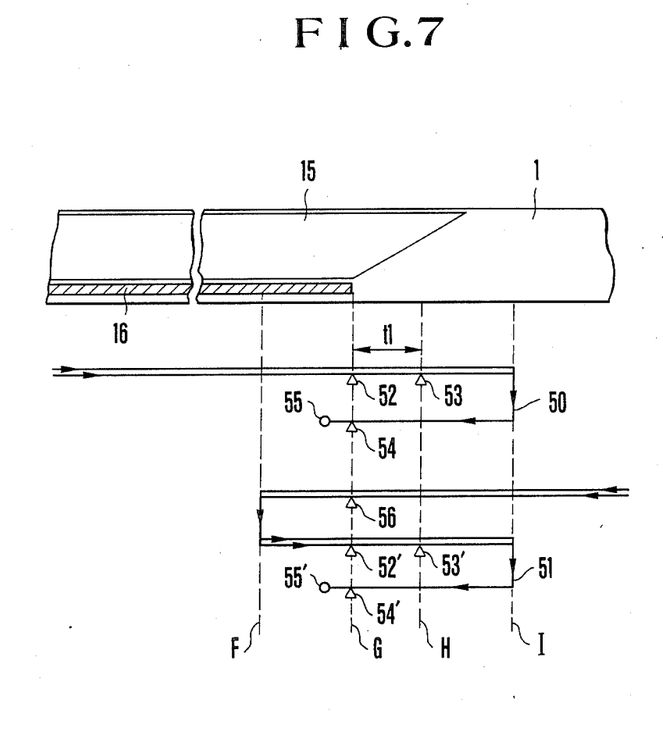
FIG. 7 is an illustration conceptionally showing a blank search control method employed by the VTR of FIG. 1.

The operation and details of the specific circuit arrangement of the blank search circuit 10 shown in FIG. 1 are as follows: FIG. 7 shows the concept of the blank search control method employed in the VTR of this embodiment. In FIG. 7, a line 50 indicates the position of the head 5 where the blank search is to be performed in the FF mode. A line 51 indicates the position of the head 5 in performing the blank search in the FR mode. In the same manner as in the case of FIG. 5, the mark Δ indicates each detecting position; the mark o a final stopping position; and the double line the travel of the tape 1 at a high speed respectively.

In the blank search performed in the FF mode, a level drop in the reproduced cue signal is detected at a point G (Δ 52) of the FF mode. After that, at a point H (Δ 53), it is detected that the level of the reproduced cue signal does not rise after the tape 1 travels a predetermined distance. By this, it is detected that this part represents the non-recorded part 16b of a video signal. The FF mode is thus cancelled at this point of time. Then, as mentioned in the foregoing, the force of inertia causes the head 5 to move to a point I. At the point I, therefore, the tape 1 is rewound at a low speed in the reverse direction. The rise of the reproduced cue signal is then detected at a point G (Δ 54) and the tape 1 travelling. Since the tape 1 is travelling at a low speed this time, the head comes to a stop at a point (o 55) close to the point G.

When the blank search is performed in the FR mode, the FR mode is cancelled when a rise of the reproduced cue signal is detected at the point G (Δ 56). The fore of inertia then moves the head 5 up to a point F. After that, the mode is changed to the FF mode to bring the travel of the tape 1 to a stop when the head 5 comes to a point close to the point G indicated by the mark o 55' through exactly the same steps (indicated by Δ 52', Δ 53' and Δ 54') as in the case of the blank search in the FF mode described in the foregoing.

In accordance with the method described above, the blank search can be accomplished with the cue signal consisting of only one kind of clock pulses without being mistaken for a head finding process. The stopping position of the tape 1 is stably obtainable with the adverse effect of the force of inertia reduced. Furthermore, the number of steps required for stopping can be minimized.

Figure 8:
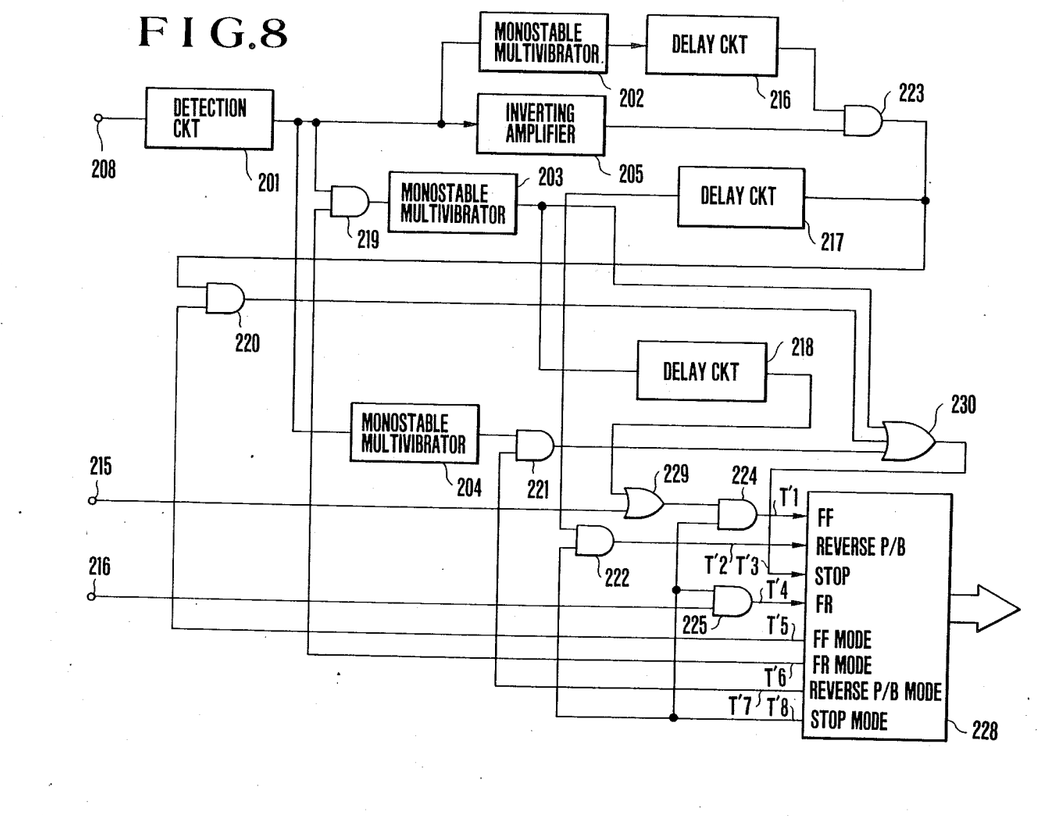
FIG. 8 is a circuit diagram showing, by way of example, the details of a blank search control circuit which is shown in FIG. 1.

FIG. 8 shows, by way of example, a circuit arranged to carry out the above-stated blank search. Referring to FIG. 8, a terminal 208 is arranged to receive the reproduced cue signal produced from the terminal 49 shown in FIG. 3. The signal is identical to the signal supplied to the terminal 108 of FIG. 6. Terminals 215 and 216 are respectively arranged to receive FF blank search instructions from the system controller 8. These instructions come in the form of pulse signals. The circuit arrangement includes a detection circuit 201; monostable multivibrators 202, 203 and 204; an inverting amplifier 205; delay circuits 216, 217 and 218; AND gates 219, 220, 221, 222, 223, 224 and 225; a control data generating circuit 228; and OR gats 229 and 230. The control data generating circuit 228 is similar to the circuit 128 of FIG. 6 and, therefore, requires no further description. Inputs and outputs T'1–T'8 of the circuit 228 are similar to the inputs and outputs T1–T8 of the circuit 128 described in the foregoing.

The operation of the circuit arrangment of FIG. 8 is as described below with reference to FIG. 7:

In performing the FF blank search, a pulse signal instructed to perform the FF blank search is supplied from the terminal 215. The pulse signal is supplied via the OR gate 229 to one of the input terminals of the AND gate 224. At this point of time, since the tape 1 is in repose, the signal T'8 is at H. Therefore, the level of the signal T'1 momentarily becomes H in response to the above-stated pulse signal. The tape 1 is then moved fast in the forward direction. The head 5 traces the recording track 16 to reproduce a cue signal.

When the head 5 comes to the point G (Δ 52) shown in FIG. 7 under this condition, the output level of the detection circuit 201 changes from H to L. At the same time, the output level of the inverting amplifier 205 changes from L to H. Then, a fall in the output level of the detection circuit 201 triggers the monostable multivibrator 202 to generate a pulse of a narrow width. This pulse is delayed by the delay circuit 216 for a period of time T1 required for allowing the tape 1 to travel the predetermined distance t1 at the fast feeding (FF) speed. After the delay, the pulse is supplied to the AND gate 223. When the head 5 reaches the point H (Δ 53) after passing the distance t1 beyond the point G, if the cue signal is not reproduced again, the output level of the detection circuit 201 remains at L and the output of the inverting amplifier at H. Therefore, if this part (the point G) is the head or beginning of a non-recorded part 16b of a video signal (or the head of a blank part), the AND gate 223 generates a pulse at the point Δ 53.

The pulse produced from the AND gate 223 is supplied to one of the input terminals of the AND gate 220. To the other input terminal of the AND gate 220 is supplied the signal T'5. The signal T'5 is at H. Then, the pulse indicative of the head 5 or beginning of the blank part becomes the signal T'3 through the AND gate 220 and the OR gate 230. The apparatus shifts to a stopping mode at that instant. The tape 1 is then brought to a stop. However, due to the above-stated force of inertia, the tape 1 does not actually come to a stop until the head 5 reaches the point I. With the apparatus having come to the stopping mode, the level of the signal T'8 changes to H. Then, after the lapse of a short delay period, the above-stated pulse indicative of the beginning or head of the blank is supplied to one of the input terminals of the AND gate 222 via the delay circuit 217. At this instant, since the level of the signal T'8 again has become H, the signal T'2 is produced in the form of a narrow pulse from the AND gate 222. This brings the apparatus into a reverse P/B mode. With the apparatus having become the reverse P/B mode, the tape 1 begins to travel at a low speed in the reverse direction. When the head 5 again comes to the point G (Δ 54), the output level of the detection circuit 201 changes from L to H. Then, a rise in the input of the monostable multivibrator 204 causes the monostable multivibrator 204 to produce a narrow pulse. Accordingly, the AND gate 221 produces a narrow pulse at the point Δ 54. This pulse then becomes the signal T'3 via the OR gate 230. This brings the apparatus again into the stop mode. However, since the tape 1 is travelling at a low speed this time, the tape 1 comes to a stop when the head 5 is at the point (o 55) close to the point G.

In the event of an instruction for FR blank search, the various parts of FIG. 8 operate in a manner as described below with reference to the line 51 of FIG. 7: When a narrow pulse indicative of the FR blank search is supplied to the terminal 216, the pulse is supplied via the AND gate 225 to the circuit 228 as the signal T'4. This brings the apparatus into the FR mode. The output level of the detection circuit 201 becomes H when the head 5 reaches the point G (Δ 56). Then, the output level of the AND gate 219 also becomes H. The rise of the input then triggers the monostable multivibrator 203 to generate a narrow pulse. This pulse becomes the signal T'3 via the OR gate 230. The signal T'3 brings the apparatus into the stop mode for a while. Meanwhile the pulse is delayed a little by the delay circuit 218. After the short delay, the pulse is supplied to the AND gate 224 via the OR gate 229. At this point of time, the level of the signal T'8 is already at H causing the AND gate 224 to generate a narrow pulse as the signal T'1. Meanwhile, the tape 1 has been stopped in the state of having the head 5 at the point F due to the force of inertia. After that, the apparatus becomes the FF mode operates in the same manner as the above-stated FF blank search. In other words, in FIG. 7, the points Δ 52', Δ 53' and Δ 54' indicate operations similar to the points Δ 52, Δ 53 and Δ 54. The stop position o 55' is also the same as the position o 55.

As is apparent from the above description, the above-stated blank search can be accomplished by the circuit arrangement shown in FIG. 8. Accordingly the advantages described in the foregoing, of course, also can be attained by the circuit arrangement. The detection circuit 201 is preferably not responsive to a level drop of the reproduced cue signal for a short period due to a drop-out or the like.

Modification of the Arrangement

In the specific embodiment described, the VTR is arranged to use the cue signal for head finding and blank search operations. However, in cases where the VTR is desired to have some additional control functions, such additional functions can be readily imparted to the VTR by superimposing other signals on the cue signal of the embodiment described in the foregoing. In that event, it is preferable, for example, to have the additional signal superimposed in a frequency sharing manner so that the different signals can be readily separated during reproduction of the cue signal.

In the embodiment described, the head finding control circuit 9 and the blank search control circuit 10 are arranged separate from each other. However, they include many parts operating in similar manners, as will be apparent from the foregoing description. Therefore, they may be arranged to use such parts in common.

Furthermore, in the embodiment described, the tape 1 is caused to travel by the capstan 13 in the FF and FR modes. However, the tape may be arranged to be caused to travel by means of a reel instead of the capstan. In that instance, however, the travelling speed of the tape keeps on changing according as the coil diameter of the tape on the reel changes. This makes it difficult to obtain the predetermined distance t1. Therefore, in that instance, the VTR must be arranged taking into consideration the fact that the distance t1 varies within a predetermined range. For example, the distance t1 may be set at such a value that permits, discrimination between the head of a video signal and a blank part of the tape even when the criterion for determination to be made by means of the counter 110 and the delay time t1 defined by means of the delay circuit 216 vary to some extent.

What is claimed is:

1. An information signal recording apparatus, comprising:
   (a) first recording means for recording an information signal within a main recording area provided on a tape-shaped record bearing medium in the longitudinal direction of said record bearing medium;
   (b) second recording means for recording a control signal within a sub-recording area provided on said tape-shaped record bearing medium in the longitudinal direction thereof in relation to the information signal recording action of said first recording means; and
   (c) prohibiting means for prohibiting the control signal from being recorded by said second recording means for a predetermined period of time.

2. An apparatus according to claim 1, wherein said prohibiting means operates on the basis of timing for the start of information signal recording by said first recording means.

3. An apparatus according to claim 2, wherein said recording means begins to record said control signal concurrently with commencement of said information signal recording by said first recording means; and said prohibiting means operates after the lapse of a predetermined period of time from said commencement of information signal recording.

4. An apparatus according to claim 3, wherein said second recording means ends said control signal recording concurrently with completion of information signal recording by said first recording means.

5. An apparatus according to claim 1, wherein said control signal includes a continuous wave signal of a predetermined frequency; and said predetermined prohibiting period of said prohibiting means is longer than the period of said continuous wave signal.

6. An information signal recording apparatus, comprising:
   (a) first recording means for recording an information signal within a main recording area provided on a tape-shaped record bearing medium in the longitudinal direction of said record bearing medium;
   (b) second recording means for recording a control signal in a position within a sub-recording area provided on said tape-shaped record bearing medium in the longitudinal direction thereof, said position being related to the recorded position of said information signal recorded by said first recording means; and
   (c) prohibiting means for prohibiting said control signal from being recorded by said second recording means for a predetermined length in the longitudinal direction of said record bearing medium.

7. An apparatus according to claim 6, wherein the position in which said control signal is prohibited from being recorded by said prohibiting means is related to a position in which said information signal begins to be recorded in said main recording area.

8. An apparatus for recording and/or reproducing an information signal on a tape-shaped record bearing medium having a main recording area for recording said information signal and a sub-recording area for recording a control signal in a position which is related to the recorded position of said information signal in the main recording area and is not within a non-recording part of a predetermined length arranged in a specific position, both said main recording and sub-recording areas extending in the longitudinal direction of said medium, comprising:
(a) reproducing means for reproducing said control signal from said sub-recording area;
(b) determining means for determining whether a change occurred in the output of said reproducing means is caused by said non-recording part of the predetermined length;
(c) moving means for moving said tape-shaped record bearing medium in the longitudinal direction thereof; and
(d) control means for controlling said moving means on the basis of the output of said reproducing means and that of said determining means.

9. An apparatus according to claim 8, wherein said control means includes first means and second means which are arranged to be selectively used according to the output of said determining means and to control said moving means on the basis of the output of said reproducing means respectively.

10. An apparatus according to claim 9, wherein said first means controls said moving means to have said reproducing means positioned close to said specific position.

11. An apparatus according to claim 10, further comprising recording means for recording said information signal in said main recording area; and wherein said second means is arranged to control said moving means to have said recording means positioned close to the end of a non-recorded part of said main recording area.

12. An apparatus according to claim 8, wherein said determining means includes time counting means for counting the length of a period of time during which the output of said reproducing means changes while said tape-shaped record bearing medium is moving in the longitudinal direction thereof.

13. An apparatus according to claim 12, wherein said time counting means includes a clock pulse generator which generates clock pulses of a predetermined frequency and a counter which is arranged to count said clock pulses.

14. An apparatus according to claim 13, wherein said time counting means further includes switch-over means which switches over the frequency of the clock pulses produced from said clock pulse generator between a first predetermined frequency and a second predetermined frequency in relation to the speed at which said tape-shaped record bearing medium is moved by said moving means.

15. An apparatus according to claim 12, wherein said determining means includes means for exempting a count period of time counted by said time counting means from being subjected to the determining operation of said determining means in the event that said count period is shorter than a predetermined length of time.

16. An apparatus using a tape-shaped record bearing medium having a main recording area for recording an information signal and a sub-recording area for recording a control signal in a position which is related to the recorded position of said information signal in said main recording area and is not within a non-recording part of a predetermined length arranged in a specific position, both said main recording and sub-recording areas extending in the longitudinal direction of said medium, comprising:
(a) reproducing means for reproducing said control signal from said sub-recording area;
(b) determining means for determining whether a change occurred in the output of said reproducing means is caused by said non-recording part of a predetermined length or by a non-recorded part of said control signal of said sub-recording area which is related to said non-recording part of said information signal of said main recording area or by something else;
(c) moving means for moving said tape-shaped record bearing medium in the longitudinal direction thereof; and
(d) control means for controlling the stopping position of said tape-shaped record bearing medium when said medium is moved, said control being accomplished on the basis of the output of said determining means.

17. An apparatus using a tape-shaped record bearing medium having a main recording area for recording an information signal and a sub-recording area for recording a control signal in a position which is related to the recorded position of said information signal in said main recording area and is not within a non-recording part of a predetermined length arranged in a specific position, both said main recording and sub-recording areas extending in the longitudinal direction of said medium, comprising:
(a) reproducing means for reproducing said control signal from said sub-recording area;
(b) moving means for moving said tape-shaped record bearing medium in the longitudinal direction thereof;
(c) determining means for determining, during the travel of said tape-shaped record bearing medium caused by said moving means in the first longitidinal direction thereof at a first speed, whether or not a change occurred in the output of said reproducing means is caused by said non-recording part of a predetermined length;
(d) first control means arranged to control said moving means to cause said tape-shaped record bearing medium to travel at a second speed which is lower than said first speed in a second direction which is reverse to the first direction on the basis of the output of said determining means; and
second control means arranged to control said moving means to bring said tape-shaped record bearing medium to a stop when the output of detecting means which detects the output of said reproducing means changes while said moving means is under the control of said first control means.

18. A method for bringing to a stop a tape-shaped record bearing medium having a main recording area for recording an information signal and a sub-recording area for recording a control signal in a position which is related to the recorded position of said information signal in said main recording area and is not within a non-recording part of a predetermined length arranged in a specific position, both said main recording and sub-recording areas extending in the longitudinal direction of said medium, comprising:

(a) a step of causing said tape-shaped record bearing medium to travel in a first longitudinal direction at a first speed and detecting a level drop point of a reproduced control signal obtained from said control signal;

(b) a second step of determining whether the level drop point detected by said first step corresponds to a desired stopping position;

(c) a third step of causing said tape-shaped record bearing medium to travel in a second direction which is reverse to said first direction and at a second speed which is lower than said first speed when said level drop point is determined by said second step to be corresponding to said desired stopping point; and (d) a fourth step of bringing said tape-shaped record bearing medium to a stop by detecting a level rise point of said reproduced control signal while said medium is travelling in said second direction and at said second speed.

19. An apparatus using a tape-shaped record bearing medium having a main recording area for recording an information signal and a sub-recording area for recording a control signal in a position which is related to the recorded position of said information signal in said main recording area and is not within a non-recording part of a predetermined length arranged in a specific position, both said main recording and sub-recording areas extending in the longitudinal direction of said medium, comprising:

(a) reproducing means for reproducing said control signal from said sub-recording area;

(b) moving means for moving said tape-shaped record bearing medium in the longitudinal direction thereof;

(c) determining means for determining whether a change occurred in the output of said reproducing means is caused by said non-recording part of a predetermined length;

d) first control means which, while said tape-shaped record bearing medium is being caused to travel in a first longitudinal direction thereof by said moving means, controls said moving means to have said medium caused to travel in a second longitudinal direction which is reverse to said first direction on the basis of the output of said determining means; and (e) second control means which, while said tape-shaped record bearing medium is being caused to travel in said second longitudinal direction thereof by said moving means, controls said moving means to bring said tape-shaped record bearing medium to a stop on the basis of the output of said determining means.

20. An apparatus according to claim 19, wherein said tape-shaped record bearing medium stopping operation of said second control means includes:

a first step of causing said tape-shaped record bearing medium to travel in said first direction at a second speed which is lower than a first speed on the basis of the output of said determining menas while said medium is travelling at said first speed in said second longitudinal direction of said medium; and a second step of bringing said tape-shaped record bearing medium to a stop on the basis of the output of said reproducing means after said first step.

* * * * *